United States Patent
Tohji et al.

(10) Patent No.: US 6,964,755 B2
(45) Date of Patent: Nov. 15, 2005

(54) METHOD FOR PRODUCING HIGH ACTIVITY PHOTOCATALYST, PHOTOACTIVITY CATALYST, AND METHOD FOR TREATING HYDROGEN SULFIDE FOR RECOVERING HYDROGEN GAS UNDER LOW ENERGY BY USING HIGH ACTIVITY PHOTOCATALYST

(75) Inventors: Kazuyuki Tohji, Miyagi (JP); Atsuo Kasuya, Miyagi (JP)

(73) Assignee: Japan Science And Technology Agency, Saitama (JP)

( * ) Notice: Subject to any disclaimer, the term of this patent is extended or adjusted under 35 U.S.C. 154(b) by 229 days.

(21) Appl. No.: 10/374,257

(22) Filed: Feb. 26, 2003

(65) Prior Publication Data

US 2003/0206847 A1    Nov. 6, 2003

Related U.S. Application Data

(63) Continuation of application No. PCT/JP01/07616, filed on Sep. 3, 2001.

(30) Foreign Application Priority Data

Sep. 1, 2000    (JP) ........................ P2000-266114

(51) Int. Cl.$^7$ ................ B01D 53/52; B01J 27/04; B01J 35/02; C01B 3/06; C01B 17/02

(52) U.S. Cl. ............ 423/230; 204/157.3; 204/157.49; 204/157.52; 423/244.1; 423/648.1; 423/576.5; 502/216; 502/343

(58) Field of Search ............... 423/230, 244.1, 423/648.1, 658.2, 576.5; 502/216, 343; 204/157.3, 204/157.49, 157.52

(56) References Cited

U.S. PATENT DOCUMENTS

| | | | | |
|---|---|---|---|---|
| 4,602,988 A | * | 7/1986 | Kolts | 204/157.52 |
| 6,017,425 A | * | 1/2000 | Park et al. | 204/157.52 |
| 6,077,497 A | * | 6/2000 | Park et al. | 423/648.1 |
| 6,248,218 B1 | * | 6/2001 | Linkous et al. | 204/157.49 |
| 6,297,190 B1 | * | 10/2001 | Park et al. | 502/327 |
| 6,517,806 B2 | * | 2/2003 | Park et al. | 423/657 |
| 6,572,829 B2 | * | 6/2003 | Linkous et al. | 422/186.03 |

FOREIGN PATENT DOCUMENTS

| | | | |
|---|---|---|---|
| JP | 62-65743 | * | 3/1987 |
| JP | 1-119394 | * | 5/1988 |
| JP | 2001-190964 | * | 7/2001 |

OTHER PUBLICATIONS

Machine translation of JP 2001-190964, cited above.*
International Search Report for International Application PCT/JP01/07616 (English translation, with mailing date of Dec. 4, 2001.*

(Continued)

*Primary Examiner*—Stanley S. Silverman
*Assistant Examiner*—Ardith E. Hertzog
(74) *Attorney, Agent, or Firm*—Doyle B. Johnson; Reed Smith LLP

(57) ABSTRACT

A high activity catalyst is obtained by oxidizing and modifying the surface of zinc sulfide by hydrogen peroxide. An oxidation treatment is carried out in basic aqueous solution. The high activity photocatalyst is added to the basic aqueous solution in which hydrogen sulfide is dissolved to recover hydrogen and sulfur under low energy. Thus, the inexpensive high activity photocatalyst having a high catalytic activity and a long duration of life is realized and hydrogen gas is efficiently generated under little energy.

9 Claims, 7 Drawing Sheets

OTHER PUBLICATIONS

International Search Report for International Application PCT/JP01/07616 (English translation, with completion date of Nov. 13, 2002.*

Supplementary European Search Report for EP 01 96 1324 (corresponding to International Application PCT/JP01/07616), with mailing date of Oct. 29, 2004.*

* cited by examiner

METHOD FOR PRODUCING HIGH ACTIVITY PHOTOCATALYST, PHOTOACTIVITY CATALYST, AND METHOD FOR TREATING HYDROGEN SULFIDE FOR RECOVERING HYDROGEN GAS UNDER LOW ENERGY BY USING HIGH ACTIVITY PHOTOCATALYST

CROSS-REFERENCE TO RELATED APPLICATIONS

This is a continuation of International Application PCT/JP01/07616, with an international filing date of Sep. 3, 2001, which was not published in English under PCT Article 21(2).

TECHNICAL FIELD

The present invention relates to a method for producing a high activity photocatalyst widely employed in the fields of chemical industry and environmental protection and the like, to a photoactivity catalyst obtained by the method, and more particularly to a method for treating hydrogen sulfide using the high activity photocatalyst.

BACKGROUND ART

The application of a photocatalyst technology begins to be put to practical use by utilizing characteristics for promoting various chemical reactions such as the decomposition of environmental contaminated substances, malodorous components, miscellaneous bacteria, etc. As the examples thereof, there are exemplified antibacterial tiles used in the operating rooms of a hospital, filters of air cleaners or air conditioners, glass of illuminating lamps in a tunnel of an express-highway and the like.

While these examples show the practical uses employing an oxidation capability, there has been also carried out a study for obtaining hydrogen by making a photocatalyst act on water. However, the application of the photocatalyst is not limited to thereto, and the photocatalyst may be made to act on toxic substances to obtain useful chemical substances.

For example, it may be considered that the photocatalyst may be applied to a desulfurization process of crude oil.

FIG. 1 shows the desulfurization process of the crude oil which is generally currently carried out.

As shown in FIG. 1, when the crude oil is distilled, heavy naphtha is hydrogenated and refined to produce hydrogen sulfide from all sulfur contained in the crude oil and recover hydrogen sulfide. The hydrogen sulfide generated in this case is oxidized via a process called the Claus method (see FIG. 2) to recover sulfur. The Claus method indicates the process that ⅓ as much as the hydrogen sulfide is oxidized to produce sulfur dioxide gas and the sulfur dioxide gas is made to react with remaining hydrogen sulfide to obtain sulfur. In the process for producing sulfur, since not only the catalytic reaction of the sulfur dioxide gas and the hydrogen sulfide, but also a heating operation or an aggregation is repeated, enormous energy is required. Further, it is undesirably expensive to manage the sulfur dioxide gas.

In the above described process for hydrogenating the heavy naphtha, hydrogen gas is employed. FIG. 3 shows a hydrogen producing process which is ordinarily carried out.

FIG. 3 shows a hydrogen producing method called a low temperature hydrogen refining method or a nitrogen cleaning method. According to this method, hydrogen is produced from gas rich in hydrogen. This method can be also applied to crude gas generated from processes except the above described hydrocarbon decomposition process. In the hydrogen producing method, raw gas is compressed and the compressed gas is cleaned with sodium hydroxide to firstly remove carbon dioxide gas and hydrogen sulfide therefrom. Then, methane and hydrocarbon gas having C4 or more are cooled under a heat exchange between low temperature refined hydrogen gas and them in a heat exchanger to be liquefied and removed. Then, the liquefied and removed gas enters the bottom part of a nitrogen cleaning tower and is cleaned with liquefied nitrogen descending from the top of the tower on its way to the tower. Thus, liquid carbon monoxide and nitrogen are obtained from the bottom of the tower and refined and separated hydrogen gas is obtained from the top of the tower.

In these hydrogen producing processes, a refining process is needed for avoiding a catalyst from being made toxic mainly by a sulfur compound such as hydrogen sulfide. In addition, since a heating operation or an aggregation is repeated, enormous energy is required.

That is, sulfur is useful as a raw material for sulfuric acid or carbon disulfide and hydrogen gas to which an attention is recently paid as fuel for a fuel cell is used for the process for hydrogenating and refining the crude oil, a manufacture of a semiconductor, a modification of fat and oil, a welding, metallurgy and the like. However, in order to produce sulfur or hydrogen gas, a heating operation and an aggregation are repeated, so that extremely much energy is required.

As mentioned above, in the conventional sulfur producing process or the hydrogen producing process, the heating operation or the aggregation is repeatedly carried out, so that enormous energy is needed.

Therefore, if sulfur and hydrogen can be simply taken out from hydrogen sulfide and the taken-out hydrogen can be returned to a desulfurization process, this method will especially serve as an useful chemical recycle.

DISCLOSURE OF THE INVENTION

It is an object of the present invention to propose a method for producing a new and inexpensive high activity photocatalyst which has a high catalytic activity and long duration of life, and a photoactivity catalyst obtained by the method.

Further, it is another object of the present invention to efficiently generate sulfur and hydrogen available for not only inorganic and organic chemical industries, but also for the whole industries from aqueous alkaline solution containing sulfide ions by using the photocatalyst.

A method for producing a high activity photocatalyst according to the present invention, wherein the surface of zinc sulfide is subjected to an oxidation treatment and modified by hydrogen peroxide.

Further, a method for treating hydrogen sulfide using a high activity photocatalyst according to the present invention, wherein zinc sulfide oxidized and modified by hydrogen peroxide is added to basic aqueous solution in which hydrogen sulfide is dissolved to recover hydrogen and sulfur.

Since zinc sulfide particles as a photocatalyst according to the present invention are treated with an oxidant, it may be estimated that any concentration gradient (sulfur atoms, oxygen atoms, zinc atoms, an oxidation state and the like) is generated in a part in the vicinity of the surface of the zinc sulfide and in the inner parts of the particles. Therefore, free electrons and free holes generated by the irradiation of light move so as to be separated from each other and the recombination of the free electrons and the free holes is reduced, and the site of an oxidation reaction is completely separated from the site of a reduction reaction, so that the recombination of a product from the oxidation reaction and a product from a reduction reaction can be prevented.

Thus, the free electrons and the free holes produced by the irradiation of light are effectively employed for a desired oxidation-reduction reaction to exhibit a high activity of the photocatalyst.

Further, when the zinc sulfide particles as the photocatalyst are used, if hydrogen sulfide is dissolved in basic aqueous solution as a react material, sulfide ions in the aqueous solution will be oxidized to polysulfide ions. Thus, zinc ions in the zinc sulfide particles can be prevented from being zincate ions and being dissolved in the aqueous solution. Accordingly, the photocatalytic property of the zinc sulfide particles is not deteriorated. Upon oxidation reaction of the sulfide ions to the polysulfide ions, a reduction reaction of hydrogen ions to hydrogen gas is retrogressively generated at the same time.

Now, the feature of a treating method for producing hydrogen and polysulfide ions from hydrogen sulfide by using the oxidation-reduction reaction will be described below. In a high activity photocatalyst, a surface of zinc sulfide is subjected to an oxidation treatment and modified by hydrogen peroxide and a part of sulfur atoms of the zinc sulfide is replaced by oxygen atoms and the rate of replacement is the higher on the surfaces of the particles. The zinc sulfide has the thin pieces of primary particles aggregating with their surfaces directed to the surfaces of the particles. It is preferred that the oxidation treatment is carried out in basic aqueous solution, and further preferred that the basic aqueous solution is heated and agitated upon the oxidation treatment.

Since the aqueous alkaline solution merely provides an alkaline reaction field for the dissolution and dissociation of hydrogen sulfide and does not change by itself, sodium hydroxide is described as a representative of the aqueous alkaline solution.

When hydrogen sulfide gas is mixed with sodium hydroxide solution, a neutralization reaction as described below is generated so that the hydrogen sulfide gas is dissolved in the sodium hydroxide solution to become sodium sulfide solution.

$2NaOH + H_2S \rightarrow 2Na^+ + SH^- + OH^- + H_2O$

When fine particles of zinc sulfide oxidized by hydrogen peroxide are added to this solution and the solution is irradiated with ultraviolet rays, hydrogen and polysulfide ions are produced.

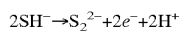
$2SH^- \rightarrow S_2^{2-} + 2e^- + 2H^+$

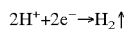
$2H^+ + 2e^- \rightarrow H_2 \uparrow$

When the generated hydrogen and polysulfide ions are respectively recovered as hydrogen gas and sulfur, the solution will return to the sodium hydroxide solution. This solution can be used as the sodium hydroxide solution for dissolving hydrogen sulfide again.

Other objects, features and advantages of the present invention will become apparent from below described embodiments or examples of the present invention and the detailed description in accordance with the accompanying drawings.

BEST MODE FOR CARRYING OUT THE INVENTION

Figure 1:
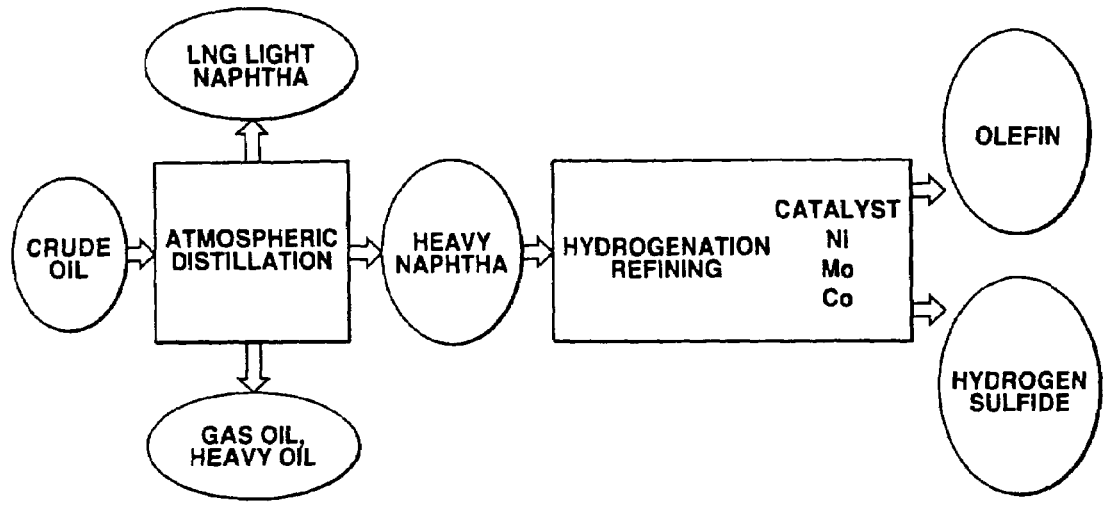
FIG. 1 is a conceptual view of a conventional desulfurization process of crude oil.
Figure 2:
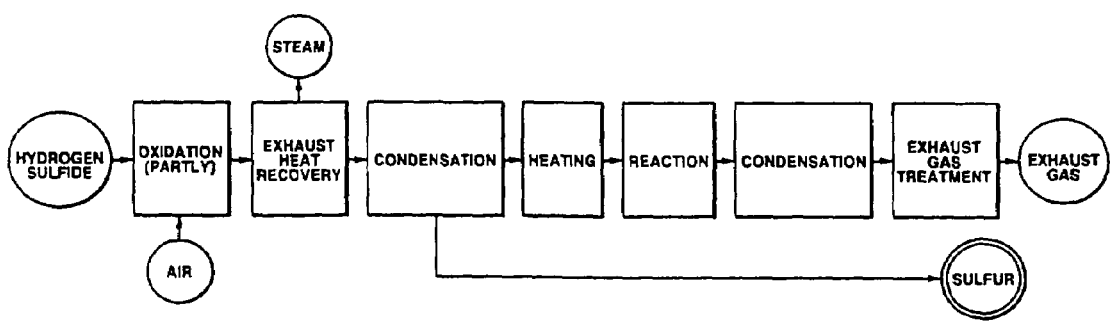
FIG. 2 is a conceptual view of a conventional sulfur recovery process.
Figure 3:
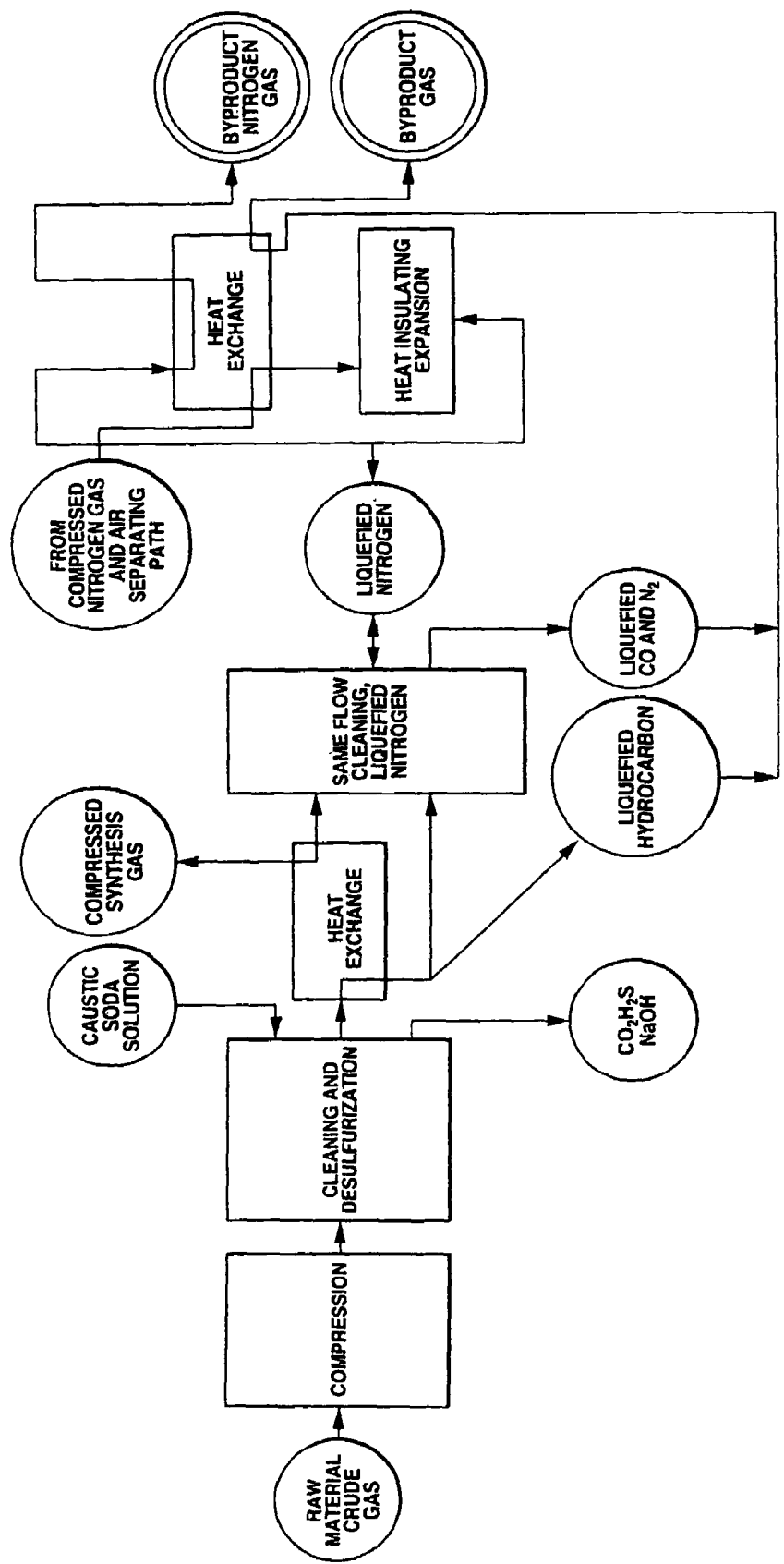
FIG. 3 is a conceptual view of a hydrogen producing process in accordance with a low temperature hydrogen refining method.

Now, a method for producing a high activity photocatalyst, a photoactivity catalyst and a method for treating hydrogen sulfide using the high activity photocatalyst to which the present invention is applied will be described by referring to the drawings.

In the method for producing the high activity photocatalyst according to the present invention, the surface of zinc sulfide is oxidized by hydrogen peroxide to be modified.

When zinc sulfide is produced, the chemical reaction process of solution including zinc ions and hydrogen sulfide is generally utilized. The zinc sulfide produced by this process is inferior in its activity as a photocatalyst. However, an oxidation treatment by hydrogen peroxide is applied to the zinc sulfide, so that zinc sulfide extremely high in its photocatalytic activity can be obtained.

As an oxidant used for the oxidation process, hydrogen peroxide is especially preferable. Further, when the hydrogen peroxide is used as the oxidant, it is desirably used with an alkaline material by which an oxidation capability is improved. As the alkaline materials in this case, there may be exemplified sodium hydroxide, potassium hydroxide and the like. In order to efficiently carry out an oxidation reaction, a heating operation and an agitating operation are desirably carried out.

A method for producing a photocatalyst using an oxidant in solution comprises, most suitably, a process of mixing particles of zinc sulfide with the oxidant (hydrogen peroxide) in sodium peroxide solution and a process of heating and agitating the mixed solution so as to efficiently carry out a reaction. Further, the producing method particles also includes a process of separating the particles of zinc sulfide after the reaction from reaction solution by a centrifugal separation or filtering and heating and drying.

Figure 4:
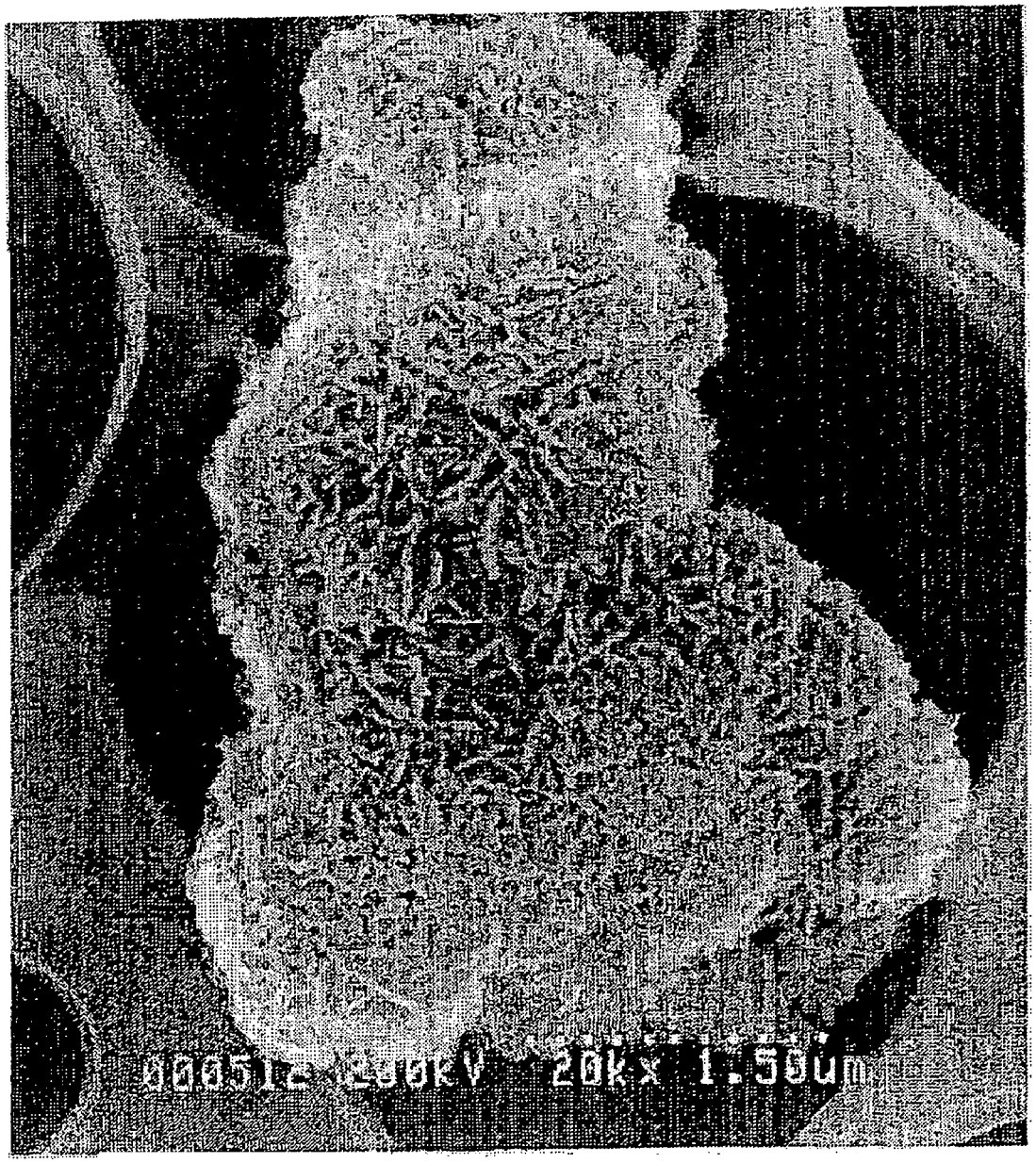
FIG. 4 is a diagram showing the surface of zinc sulfide before a hydrogen peroxide treatment is carried out.
Figure 5:
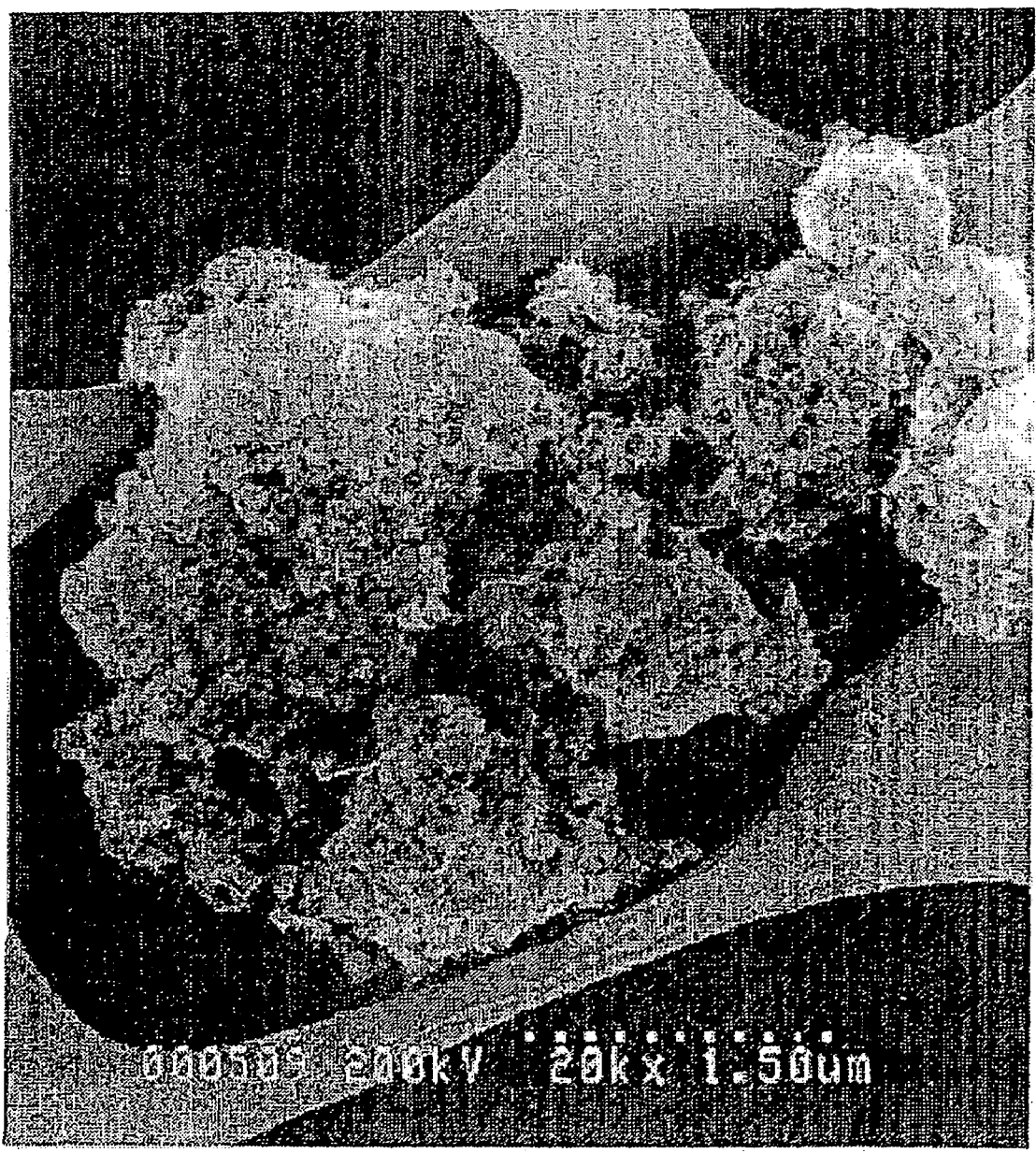
FIG. 5 is a diagram showing the surface of zinc sulfide to which a treatment by the hydrogen peroxide is applied.

Here, FIG. 4 shows the electron microphotograph of the surface of zinc sulfide before a hydrogen peroxide treatment is carried out. FIG. 5 shows a photocatalyst itself, that is, the electron microphotograph of the surface of zinc sulfide treated with the hydrogen peroxide.

Assuming that the respective diagrams show the typical surface properties of the particles of zinc sulfide before and after they are treated with the hydrogen peroxide, it is understood that the zinc sulfide before it is treated with hydrogen peroxide, that is, the zinc sulfide shown in FIG. 4 has thin pieces of primary particles aggregate so as to direct their outer sides to the surfaces of the particles.

On the other hand, the zinc sulfide treated with the hydrogen peroxide, that is, the zinc sulfide shown in FIG. 5 seems, not clearly, to have the thin pieces of primary particles aggregating with their surfaces directed to the surfaces of the particles. Apart from which structure the zinc sulfide has, since the appearances of the zinc sulfide shown in FIGS. 4 and 5 change, it can be estimated that the treatment of zinc sulfide with the hydrogen peroxide causes any reaction.

The zinc sulfide used in FIG. 5 and serving as the photocatalyst according to the present invention is obtained in such a manner that zinc sulfide particles are added to solution produced from the mixture of sodium peroxide solution and hydrogen peroxide solution, the obtained solution is heated and agitated, and then centrifugally separated to separate the zinc sulfide from the solution.

In a method for producing hydrogen and sulfur from hydrogen sulfide by employing an oxidation-reduction reaction among methods for using the photocatalyst produced as described above, hydrogen sulfide is dissolved in aqueous alkaline solution to use aqueous solution as a react material. Then, hydrogen and polysulfide ions are generated from the react material under the oxidation-reduction reaction using the photocatalyst. The preparation of alkaline hydrogen sulfide solution and the recovery of hydrogen and sulfur desirably comprise the following processes.

(1) A process of dissolving hydrogen sulfide in aqueous alkaline solution.

(2) A process of adding the photocatalyst to the solution, irradiating the solution with ultraviolet rays and recovering hydrogen gas.

(3) A process of recovering the polysulfide ions from the solution after the process (2).

(4) A process of reusing the solution after the process (3) as the aqueous alkaline solution of the process (1).

Now, specific Examples will be described below on the basis of experimental results.

EXAMPLE 1

Zinc sulfide of 500 mg produced by Kojundo Chemical Laboratory (purity of 99.999% or higher and an average particle diameter of 5 $\mu$m) was added to solution obtained from the mixture of 1 mol/liter sodium peroxide solution of 100 ml and 10% hydrogen peroxide solution of 100 ml and the obtained solution was heated (about 50° C.) and agitated for about 6 hours. Then, the solution was separated from a supernatant material by a centrifugal separator, and then, remaining paste type particles were moved to a Petri dish and dried at 80° C.

EXAMPLE 2

Zinc sulfide of 500 ml produced by the Kojundo Chemical Laboratory (purity of 99.999% or higher and an average particle diameter of 5 $\mu$m) was added to solution obtained from the mixture of 1 mol/liter potassium peroxide solution of 100 ml and 10% hydrogen peroxide solution of 100 ml, and the obtained solution was heated (about 50° C.) and agitated for about 6 hours. Then, the solution was separated from a supernatant material by a centrifugal separator, and then, remaining paste type particles were moved to a Petri dish and dried at 80° C.

These operations are carried out so that a part of sulfur atoms of the zinc sulfide is replaced by oxygen atoms. It is estimated that the rate of replacement is increased more on the surface of the particles.

Now, the photocatalytic performance of the zinc sulfide subject to the oxidation treatment will be described below.

Figure 6:
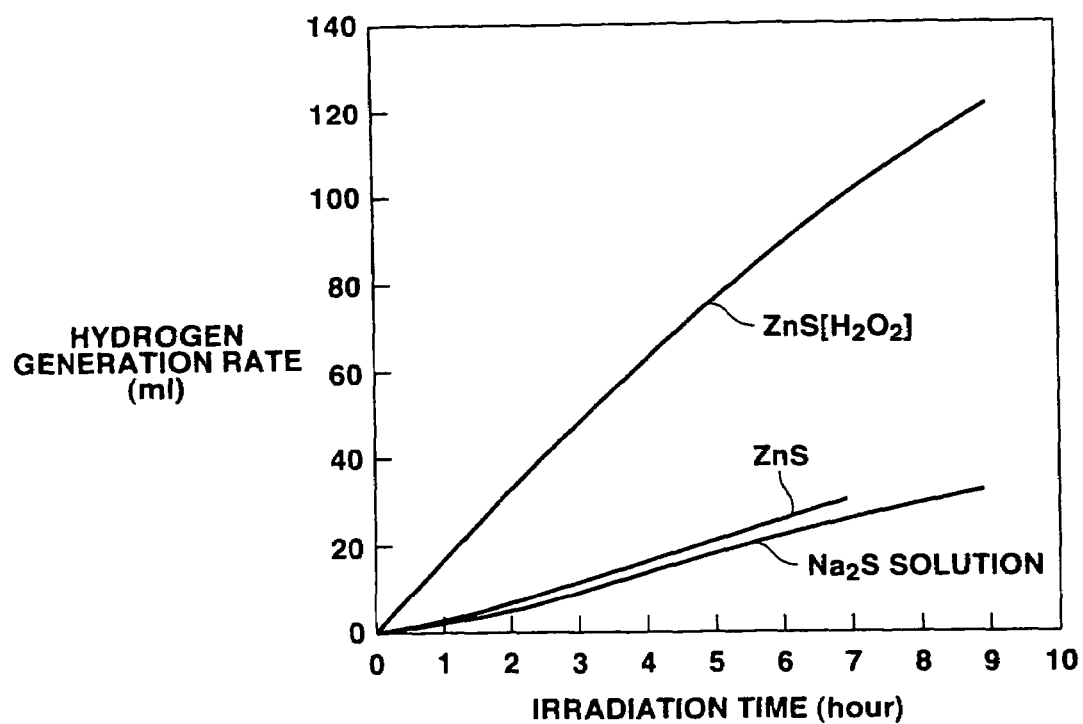
FIG. 6 is a characteristic view showing performance comparison results obtained by comparing the amount of generation of hydrogen gas for the zinc sulfide before an oxidation treatment is carried out with that for the zinc sulfide after an oxidation treatment is carried out when sodium sulfide solution is irradiated with ultraviolet rays.

FIG. 6 shows performance comparison results that the amount of generation of hydrogen gas for the zinc sulfide before the oxidation treatment is applied thereto is compared with that for the zinc sulfide after the oxidation treatment is applied thereto when sodium sulfide solution is irradiated with ultraviolet rays by the same device under the same conditions in order to exhibit the performance of the photocatalyst.

Figure 7:
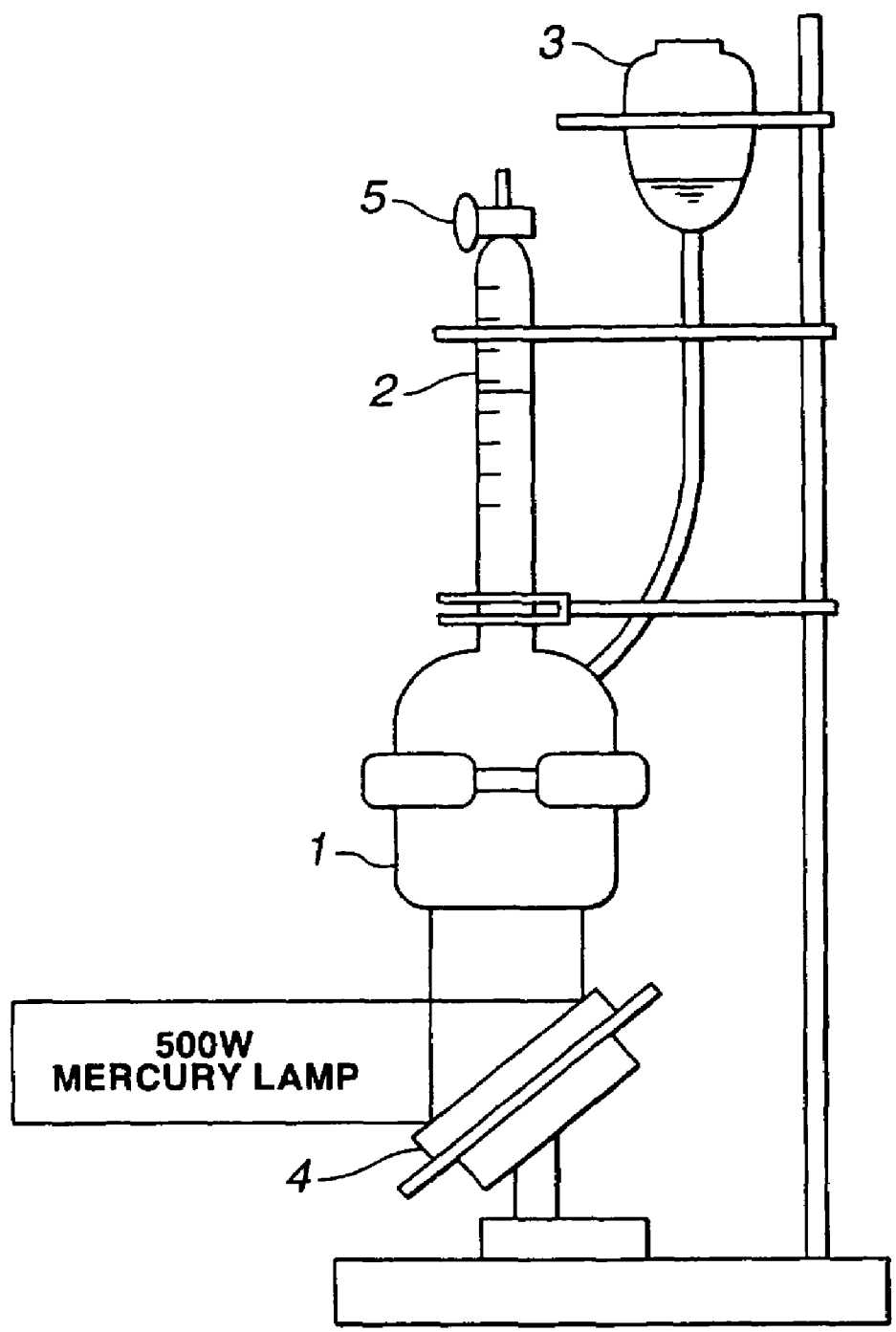
FIG. 7 is a schematic view showing the configuration of a device used for a performance comparison test.

A device utilized for the performance comparison is shown in FIG. 7. As shown in FIG. 7, the device comprises an optically reacting part 1 made of quartz glass, a hydrogen determination part 2 for determining generated hydrogen, a solution reservoir 3 for storing sodium sulfide solution having the volume corresponding to the volume of the generated hydrogen gas to prevent the rise of hydrogen pressure, a 500 W mercury lamp for applying ultraviolet rays (its illustration is omitted) and a lens for converging the ultraviolet rays (its illustration is omitted) and a reflecting minor 4 for reflecting the ultraviolet rays and applying them to the photocatalyst. Further, at the end of the hydrogen determination part 2, a gas vent cock 5 is provided.

At the beginning of a photochemical oxidation-reduction and decomposition reaction, an entire system is filled with sodium sulfide solution, the photocatalyst of a prescribed amount is precipitated on the bottom of the optical reacting part and a generated gas recovery port is closed to light the 500 W mercury lamp. Then, the amount of generation of hydrogen is measured at intervals of prescribed irradiation time in the hydrogen determination part.

The amount of employed photocatalyst is 50 mg and the amount of sodium sulfide solution of 0.1 molarity is 140 ml, respectively.

The reaction at this time is expressed by the following formulae.

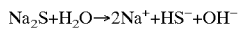

$$Na_2S + H_2O \rightarrow 2Na^+ + HS^- + OH^-$$

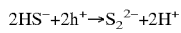

$$2HS^- + 2h^+ \rightarrow S_2^{2-} + 2H^+$$

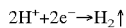

$$2H^+ + 2e^- \rightarrow H_2 \uparrow$$

Here, $e^-$ and $h^+$ indicates free electrons and free holes generated by the photocatalyst due to the irradiation of light, respectively.

As apparent from a graph showing the performance comparison in FIG. 6, the zinc sulfide subject to the oxidation treatment is much higher in its photocatalytic activity than the zinc sulfide before the oxidation treatment is applied according to the prior art. Since the zinc sulfide before the oxidation treatment is applied thereto generates an amount of hydrogen which is not substantially changed from an amount of hydrogen generated when the sodium sulfide solution is simply irradiated with the ultraviolet rays, it is not too much to say that the zinc sulfide before the oxidation treatment is carried out substantially has no photocatalytic activity. Therefore, it is recognized that the oxidation treatment is applied to the zinc sulfide so that the property of the zinc sulfide is changed to produce the free electrons and free holes and improve an activity as a catalyst that H+ and SH− become hydrogen and polysulfide ions in accordance with the oxidation-reduction reaction, respectively.

A reason why the high catalytic activity is obtained by performing the oxidation treatment resides in that a space charge is generated and an electric field is generated in the direction of depth of the particles due to a continuous change of composition that a part of sulfur atoms of the zinc sulfide is replaced by oxygen atoms and the rate of replacement is the higher on the surfaces of the particles. Since the free electrons and free holes move so as to be separated from each other due to this electric field, the recombination of the free electrons and the free holes is reduced. Further, since the reaction field of the oxidation reaction is separated from the reaction field of the reduction reaction, the recombination of a product from the oxidation reaction and a product from the reduction reaction is avoided and the catalytic activity is enhanced.

Then, the method for producing hydrogen and sulfur by employing hydrogen sulfide as a raw material will be described in the methods for using the photocatalyst having the oxidized zinc sulfide as the photocatalyst according to the present invention.

This method comprises the following processes.

(1) A process of dissolving hydrogen sulfide in aqueous alkaline solution such as sodium peroxide solution.

(2) A process of adding the photocatalyst to the solution after the process (1), and the solution is irradiated with ultraviolet rays to recover hydrogen gas.

(3) A process of recovering polysulfide ions from the solution after the process (2).

(4) A process of reusing the solution after the process (3) as the aqueous alkaline solution of the process (1).

Figure 8:
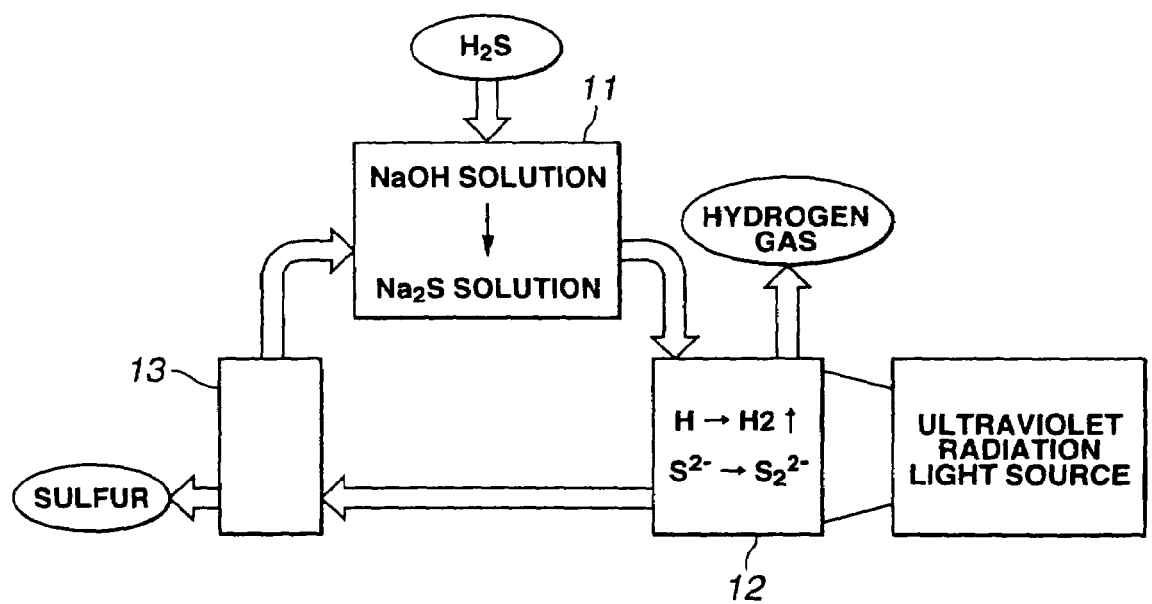
FIG. 8 is a conceptual view showing a process for producing hydrogen and sulfur by employing hydrogen sulfide as a raw material.

This method will be described by referring to FIG. 8 schematically showing the construction of the above-described processes.

In FIG. 8, a hydrogen sulfide dissolving tank 11 containing aqueous alkaline solution is a part for performing the process of (1) for dissolving hydrogen sulfide gas therein by bubbling. A photocatalyst reaction tank 12 is a part which holds the aqueous alkaline solution having the hydrogen sulfide dissolved therein by the process of (1) and the photocatalyst, has a transparent wall surface so as to be externally irradiated with the ultraviolet rays and performs the process of (2) for recovering the generated hydrogen gas. A sulfur recovery tank 13 is a part for performing the process of (3) for recovering the polysulfide ions from the solution in which the oxidation-reduction reaction is completed by the process of (2). In order to explain in detail the respective processes, the tank is divided into the hydrogen sulfide dissolving tank 11, the photocatalyst reaction tank 12 and the sulfur recovery tank 13. However, the respective tanks do not necessarily need to be separately provided.

Then, an operation of each construction in FIG. 8 will be described below.

Process (1). When hydrogen sulfide is dissolved in the hydrogen sulfide dissolving tank 11, the sodium peroxide solution becomes sodium sulfide solution in accordance with a reaction shown by the following formula.

$$2NaOH + H_2S \rightarrow 2Na^+ + HS^- + H_2O + OH^-$$

Process (2). When the sodium sulfide solution and the photocatalyst are irradiated with the ultraviolet rays from a light source in the photocatalyst reaction tank 12, the free electrons and the free holes are produced in the photocatalyst and the sodium sulfide solution is oxidized and reduced in accordance with a reaction shown by the following formulae to produce hydrogen gas and polysulfide ions.

$$2HS^- + 2h^+ \rightarrow S_2^{2-} + 2H^+$$

$$2H^+ + 2e^- \rightarrow H_2 \uparrow$$

Processes of (3) and (4). When the oxidation-reduction reaction of the sodium sulfide solution is completed, that is, hydrogen ions are reduced to hydrogen, the sodium peroxide solution including the polysulfide ions is obtained as described above. The sodium peroxide solution is moved to the sulfur recovery tank 13 to recover sulfur. The sodium peroxide solution having no sulfur is returned to the alkaline tank to be used again as the sodium peroxide solution of the process (1). As a specific recovery method of the polysulfide ions, there may be employed a method that the ions in the solution after the reaction are separated by using an ion exchange medium and the separated ions are made to react with acid or polyvalent heavy metal ions to be deposited.

Accordingly, when hydrogen and sulfur are produced using hydrogen sulfide which is an environmentally harmful material as a raw material by employing the oxidized zinc sulfide as the photocatalyst of the present invention, energy except the energy required for a light source is not especially required, nor harmful materials are generated and available materials can be produced.

Further, when the processes using the photocatalyst of the present invention are applied to the hydrogenation and desulfurization processes of crude oil, hydrogen can be produced by employing hydrogen sulfide generated in the desulfurization process as a raw material and the hydrogen produced here can be utilized again in the desulfurization process so that cost necessary for purchasing hydrogen gas can be lowered.

INDUSTRIAL APPLICABILITY

A photocatalyst according to the present invention has a high activity as a photocatalyst and is inexpensive and has a long duration of life.

When a method for producing hydrogen and sulfur from hydrogen sulfide is used by utilizing an oxidation-reduction reaction by the photocatalyst of the present invention, a practical effect that useful materials can be inexpensively produced while an environmental problem is solved.

What is claimed is:

1. A method for treating hydrogen sulfide using a high activity photocatalyst, wherein zinc sulfide particles, which have been oxidized by hydrogen peroxide, are added to basic aqueous solution in which hydrogen sulfide is dissolved to recover hydrogen and sulfur.

2. The method for treating hydrogen sulfide according to claim 1, comprising:
 a first step of dissolving hydrogen sulfide in the basic aqueous solution;
 a second step of adding the zinc sulfide particles, which have been oxidized by the hydrogen peroxide, as the photocatalyst to the basic aqueous solution in which the hydrogen sulfide is dissolved and applying light to the solution to recover hydrogen gas; and
 a third step of recovering polysulfide ions from the basic aqueous solution after the hydrogen gas is recovered, wherein the basic aqueous solution after the polysulfide ions are recovered in the third step is reused as the basic aqueous solution of the first step.

3. A method for producing a high activity photocatalyst, wherein a surface of zinc sulfide particles is subjected to an oxidation treatment by hydrogen peroxide.

4. The method for producing a high activity photocatalyst according to claim 3, wherein the oxidation treatment is carried out in basic aqueous solution.

5. The method for producing a high activity photocatalyst according to claim 4, wherein the basic aqueous solution is heated and agitated during the oxidation treatment.

6. A high activity photocatalyst, wherein surfaces of zinc sulfide particles are subjected to an oxidation treatment by hydrogen peroxide, and wherein a part of sulfur atoms of the zinc sulfide particles are replaced by oxygen atoms and the rate of replacement is higher on the surfaces of the zinc sulfide particles.

7. A high activity photocatalyst according to claim 6, wherein the oxidation treatment is carried out in basic aqueous solution.

8. A high activity photocatalyst according to claim 7, wherein the basic aqueous solution is heated and agitated during the oxidation treatment.

9. A high activity photocatalyst according to claim 6, wherein the zinc sulfide particles have a different physical construction after the oxidation treatment, as compared to before the oxidation treatment.

* * * * *